(12) United States Patent
Finck (10) Patent No.: US 11,472,054 B2
(45) Date of Patent: Oct. 18, 2022

(54) WINDER UNIT FOR VEHICLE GLAZING PANEL CUT OUT

(71) Applicant: Belron International Limited, Egham (GB)

(72) Inventor: William Finck, Brentwood (GB)

(73) Assignee: Belron International Limited, Egham (GB)

(*) Notice: Subject to any disclaimer, the term of this patent is extended or adjusted under 35 U.S.C. 154(b) by 21 days.

(21) Appl. No.: 16/785,122

(22) Filed: Feb. 7, 2020

(65) Prior Publication Data

US 2020/0338774 A1    Oct. 29, 2020

Related U.S. Application Data

(63) Continuation of application No. 16/064,207, filed as application No. PCT/EP2017/050555 on Jan. 12, 2017, now Pat. No. 10,569,437.

(30) Foreign Application Priority Data

Jan. 27, 2016  (GB) ..................... 1601500

(51) Int. Cl.
  *B26D 1/547*      (2006.01)
  *B26B 27/00*      (2006.01)
  *B32B 43/00*      (2006.01)
  *B65H 54/04*      (2006.01)

(52) U.S. Cl.
  CPC ............ *B26D 1/547* (2013.01); *B26B 27/002* (2013.01); *B32B 43/006* (2013.01); *B65H 54/04* (2013.01); *B65H 2701/354* (2013.01); *Y10S 156/927* (2013.01); *Y10S 156/939* (2013.01); *Y10T 156/1184* (2015.01); *Y10T 156/1967* (2015.01)

(58) Field of Classification Search
  CPC ......... Y10T 156/1184; Y10T 156/1967; B32B 43/006; B26B 27/002; B26D 1/547; B65H 2701/354; Y10S 156/927; Y10S 156/939
  See application file for complete search history.

(56) References Cited

U.S. PATENT DOCUMENTS

| 3,430,222 A | 2/1969 | Gratrix, Sr. et al. |
| 3,481,224 A | 12/1969 | Aijala |
| 3,985,314 A | 10/1976 | Booth |

(Continued)

FOREIGN PATENT DOCUMENTS

| CA | 2034221 A1 | 7/1991 |
| CN | 201075899 Y | 6/2008 |

(Continued)

OTHER PUBLICATIONS

Chinese Office Action and Search Report dated Jun. 10, 2020 of of Application No. 2017800042580.

(Continued)

*Primary Examiner* — Linda L Gray
(74) *Attorney, Agent, or Firm* — Gordon & Jacobson, P.C.

(57) ABSTRACT

A winder unit (1) for winding cutting line (41), for vehicle glazing panel removal, has a rotatable spindle shaft (61) for winding the cutting line (41) and a ratchet device (90) mounted to the spindle shaft (61) by means of a one-way rotational bearing or clutch (75). Typically the ratchet device (90) has a component mounted to rotate in unison with the one-way rotational bearing or clutch. The improvement provides a rotational directional control providing 2 one-way rotational control devices in concert.

14 Claims, 6 Drawing Sheets

(56) References Cited

U.S. PATENT DOCUMENTS

| | | |
|---|---|---|
| 4,955,188 A | 9/1990 | von Allworden |
| 5,908,094 A | 6/1999 | Le-Calve |
| 6,216,969 B1 | 4/2001 | Yamaguchi |
| 6,591,502 B1 | 7/2003 | Gmeilbauer |
| 6,616,800 B2 | 9/2003 | Eriksson |
| 8,307,873 B2 | 11/2012 | Klabunde et al. |
| 8,474,355 B2 | 7/2013 | Finck |
| 9,095,988 B2 | 8/2015 | Finck |
| 10,569,437 B2 | 2/2020 | Finck |
| 2006/0117573 A1 | 6/2006 | Jensen et al. |
| 2008/0012349 A1 | 1/2008 | Finck |
| 2010/0132882 A1 | 6/2010 | Hess et al. |
| 2015/0314981 A1 | 11/2015 | Finck |
| 2017/0266830 A1 | 9/2017 | Rodger |

FOREIGN PATENT DOCUMENTS

| | | |
|---|---|---|
| DE | 4012207 C1 | 10/1991 |
| DE | 202013105337 U1 | 1/2014 |
| EP | 0093283 A2 | 11/1983 |
| EP | 0892189 A1 | 1/1999 |
| GB | 2489835 A | 10/2012 |
| GB | 2494548 A | 3/2013 |
| GB | 2508822 A | 6/2014 |
| GB | 2526308 A | 11/2015 |
| SU | 952783 A1 | 8/1982 |
| TW | 201242733 A | 11/2012 |
| TW | 201427802 A | 7/2014 |
| WO | WO86/07017 A1 | 12/1986 |
| WO | WO98/58779 A1 | 12/1998 |
| WO | WO2006/030212 A1 | 3/2006 |
| WO | WO2011/101667 A2 | 8/2011 |
| WO | WO2012069804 A1 | 5/2012 |
| WO | WO2015/039703 A1 | 3/2015 |

OTHER PUBLICATIONS

Russian Search report dated May 6, 2020 of Russian Application No. 2018129718.
Taiwan Office Action of Application No. 106100946 dated Nov. 15, 2018.
Australian OA dated Jun. 30, 2021 of Application No. 2017212610.
Australian OA dated Sep. 28, 2021 of Application No. 2017212610.
Australian OA dated Nov. 24, 2021 of Application No. 2017212610.
Brazilian Search Report and Written Opinion dated Oct. 17, 2021 of Application No. BR112018015048-7N.
Chinese Office Action dated Sep. 28, 2021 of Application No. 202010122625.0.
EP Exam Report dated Dec. 17, 2021 of Application No. 17 700 291.2-1016.
Ukrainian Office Action dated Feb. 10, 2021 of Application No. a201808744.

WINDER UNIT FOR VEHICLE GLAZING PANEL CUT OUT

CROSS-REFERENCE TO RELATED APPLICATIONS

This application is a continuation of U.S. application Ser. No. 16/064,207, filed on Jun. 20, 2018, which is the National Stage of International Patent Application No. PCT/EP2017/050555, filed on Jan. 12, 2017, which claims priority from British Patent Application No. GB 1601500.0, filed on Jan. 27, 2016, all of which are hereby incorporated by reference herein in their entireties.

BACKGROUND

1. Field

The present invention relates to a winder unit for use in a vehicle glazing panel cut out technique using a cutting line such as wire or fibre.

2. State of the Art

Vehicle glazing panels such as vehicle windscreens (windshields) are typically bonded in supporting frames by adhesive bonding material such as polyurethane, applied in a continuous bead about the periphery of the glazing panel and frame.

Wire cutting techniques have been previously proposed and used to effect glazing panel removal (for replacement or otherwise). Exemplary techniques are disclosed in, for example, EP-A-0093283, Canadian Patent Specification 2034221, U.S. Pat. No. 6,616,800, German Patent 4012207 and PCT Publications WO2006/030212, WO86/07017, WO98/58779 and GB2494548. In particular WO2006/030212 and GB2494548 disclose techniques in which, during cutting, the wire can be operated in certain circumstances to slip or slide with respect to the bonding material in order to saw or cut through the bonding material. This has proved advantageous.

WO2015/039703 discloses a technique which improves upon the earlier techniques by utilizing slip cutting in a more controlled and consistent manner. The technique can be used with cutting wire or a cutting line not of metal such as a synthetic fibre cutting line.

In the technique of WO2015/039703, a loop of the cutting line is formed around the periphery of the entire windscreen in a set up phase and the cutting line is attached at opposed ends to each of respective winders spools of the cutting device. In the cut out procedure when winding in on one of the winder spools the other is configured to allow the cutting line to be drawn off the respective spool. In other words the line is attached to both spools during the cutting procedure and slip is achieved by permitting winding off from one of the spools as the line is wound on to the other. As a result there can be constant slip cutting throughout substantially the entire process (certainly for the majority of the cut out process).

Figures 1A, 1B:
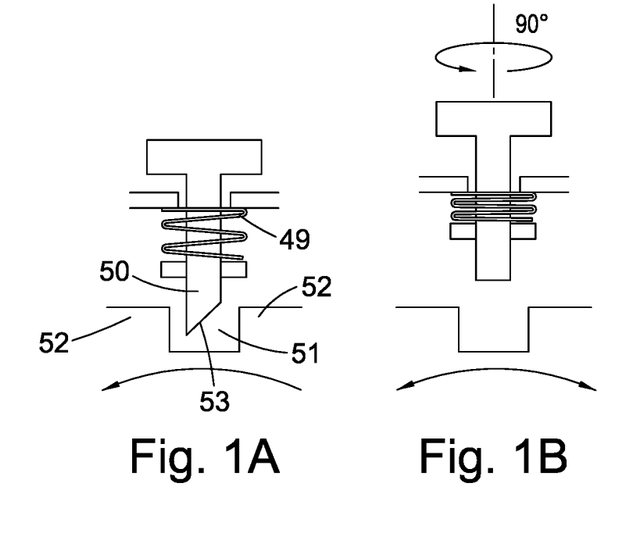
FIGS. 1A to 1C show schematically a ratchet arrangement in engaged, neutral and reverse engaged positions respectively.

Respective winder mechanisms associated with each spool have ratchets which are toggled between a 'forward ratchet permitted' position and a 'reverse ratchet permitted' position (and a neutral ratchet off position) to enable winding onto or off a respective winder spool during the cut out procedure. In the ratchet operating positions rotation is permitted in one direction only. The ratchet as shown schematically for FIGS. 1A to 1C comprises a spring loaded pawl which engages in teeth in a ratchet collar mounted on the drive shaft of the spool drive mechanism. The pawl is provided with an angled slip surface and the pawl can be lifted back against the spring so as to be rotated about its axis to reverse the position of the slip surface through 180 degrees. These alternative positions are the 'forward ratchet permitted' position and a 'reverse ratchet permitted' positions referred to earlier. In the configuration of FIG. 1A rotation is permitted in one direction only and in the other configuration (FIG. 1C) the reverse direction only. It is possible to hold the ratchet in the neutral position as shown in FIG. 1B in which rotation is permitted in either direction.

Figure 1C:
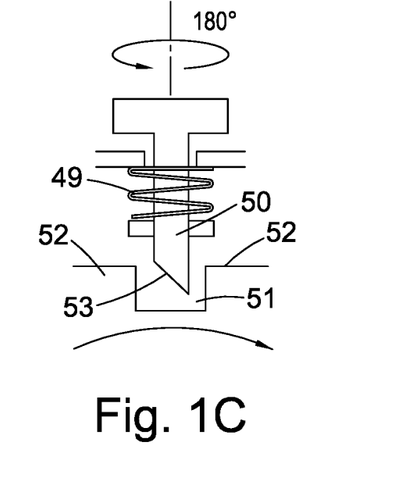

When the ratchet is operating in either the configuration of FIG. 1A or FIG. 1C each time, in the direction of permitted rotation, the pawl lifts over the teeth as rotation is effected effectively slightly compressing the spring each time. This results in greater torque being required to effect rotation than would otherwise be the case for rotation without the ratchet.

U.S. Pat. No. 6,216,969B1 relates to a mechanism for enabling one-way unwinding.

SUMMARY

An improved technique and apparatus has now been devised.

According to the invention, there is provided a winder unit for winding cutting line, the winder unit comprising a rotatable spindle shaft for winding; a ratchet device being mounted to the spindle shaft by means of a one-way rotational bearing or clutch.

According to an alternative view the invention comprises a winder unit for winding cutting line, the winder unit comprising a rotatable spindle shaft for winding; the rotatable spindle shaft being controllable to operate in:
- a first mode in which the spindle is arranged to freewheel in a first rotational direction but is inhibited from rotating in the opposed direction; and/or
- a second mode in which the spindle is arranged to be rotatable against a selectively applied resistance but is inhibited from rotating in the opposed direction; and/or,
- a third mode in which the spindle is inhibited from rotating altogether.

According to an alternative view the invention provides a winder unit for winding cutting line, the winder unit comprising a rotatable spindle shaft for winding; operation of the rotatable spindle shaft being controlled by a ratchet device and a one-way rotational bearing or clutch.

According to a further alternative view, the invention provides a winder unit for winding cutting line, the winder unit comprising a rotatable spindle shaft for winding; operation of the rotatable spindle shaft being controlled by a first one-way rotational control device (for example a ratchet); and a second one way rotational control device (for example a one way bearing or clutch); both devices acting in concert to control rotation of the spindle.

According to any aspect, it is preferred that operation is by means of:
- a first mode in which the spindle is arranged to freewheel in a first rotational direction but is inhibited from rotating in the opposed direction; and/or
- a second mode in which the spindle is arranged to be rotatable against a selectively applied resistance but is inhibited from rotating in the opposed direction; and/or,
- a third mode in which the spindle is inhibited from rotating altogether.

It is preferred that the ratchet device comprises a component mounted to rotate in unison with the one-way rotational bearing or clutch.

Preferably the ratchet device comprises a ratchet collar mounted to the one-way rotational bearing or clutch.

In one embodiment the one-way rotational bearing or clutch comprises a one way freewheel device.

In one embodiment the one-way rotational bearing or clutch comprises a sprag clutch.

The winder spool for the cutting line is mounted to the spindle.

It is preferred that the winder spool is demountable from the spindle. Magnetic means may be used to mount the spool to the spindle shaft.

The unit is preferably provided with mounting means for mounting the unit to a glazing panel.

The mounting means preferably comprises one or more sucker devices.

It is preferred that one or more rotatable cutting line guide pulleys are positioned spaced from the spindle.

It is preferred that the unit comprises a plurality of spindle shafts for mounting respective cutting line spools spaced from one another.

Beneficially, a plurality of the spindle shafts comprise a respective ratchet device being mounted to the respective spindle shaft by means of a respective one-way rotational bearing or clutch. Preferably one spindle shaft has a one way bearing or clutch device arranged to permit rotation in an opposed sense to the direction of permitted rotation of another of the spindle shafts.

The invention will now be further described in a specific embodiment by way of example and with reference to the accompanying drawings.

DETAILED DESCRIPTION

Referring to the drawings there is shown a cut out system particularly for use in cut out of bonded vehicle glazing panels such as windscreens.

Figure 2:
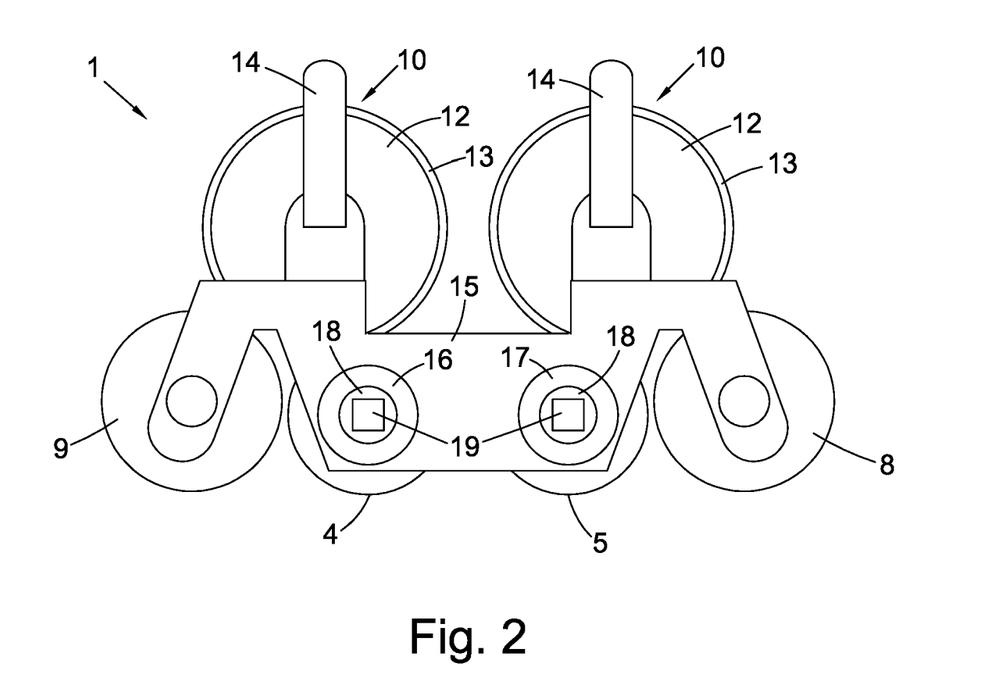
FIG. 2 is a schematic plan view of a winder unit of an exemplary cut out system in accordance with the method of the invention.

The cut out system comprises a winder unit 1 including a pair of releasable suction cup mounts 10 enabling the winder unit to be releasably secured to the windscreen. The suction cup mounts comprise a rigid plastics cup 12 and underlying flexible rubber skirt membrane 13. Respective actuation/release levers 14 enable consistent suction to be applied and released. Such suction mounts are commonly employed in windscreen replacement and repair technology. The suction cup mounts 10 are pivotably/tiltably mounted to the support chassis 15 of the winder unit to ensure that both mounts 10 can locate in good engagement with the windscreen despite the curvature of the windscreen. The main body of the support chassis 15 carries a pair of underling winding spools 4, 5 in side by side relationship. The spools are connected to axial spindle drive shafts which are supported in bearings provided on the winder unit. The spools 4, 5 are driven axially rotationally either manually via a hand winder or by means of a mechanical actuator such as a motorized winding or winching tool. The manual or automatic driving tool is configured to engage with drive bosses which are provided at the opposite end of the drive shafts to the spools 4, 5. The drive shafts are compound structures comprising a number of interconnected components as will be described in detail later.

Positioned outwardly of the winding spools 4, 5 are respective wire guide pulley wheels 8, 9 of low friction plastics material. The pulley wheels are mounted to be rotatable about respective rotational axes. The guide pulleys rotate as the cutting wire is drawn tangentially across the pulleys as will be described.

Figure 8:
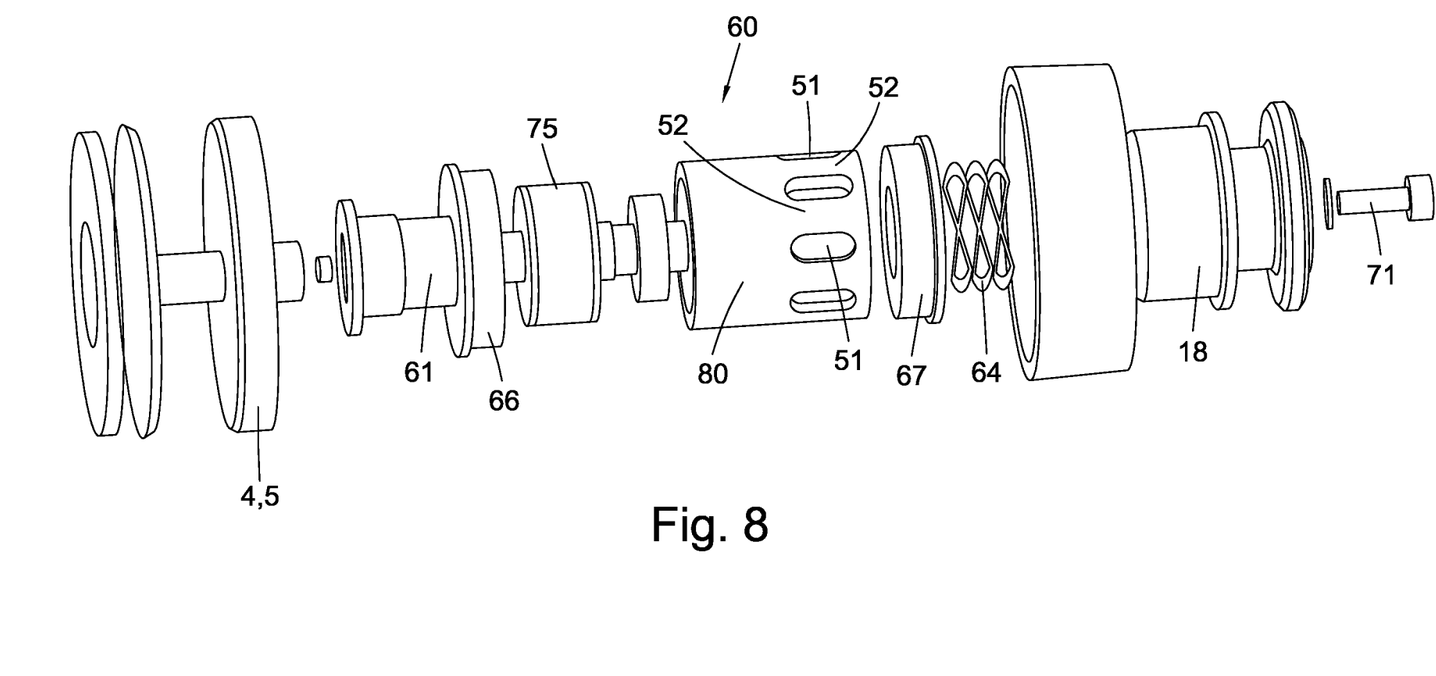

To recap in the prior art the ratchet as shown schematically for FIGS. 1A to 1C comprises a spring 49 loaded pawl 50 which engages in a recesses formed between teeth 52 in a ratchet collar mounted on the drive shaft of the spool drive mechanism. Teeth and intermediate recess for capturing the pawl 50 are provided entirely around the pawl collar. For purposes of explanation in FIGS. 1A to 1C a single recess 51 is shown in which the pawl 50 can engage. The pawl 50 is provided with an angled slip surface 53 and the pawl can be lifted back against the spring 49 so as to be rotated about its axis to reverse the position of the slip surface through 180 degrees. These alternative positions are the 'forward ratchet permitted' position and a 'reverse ratchet permitted' positions referred to earlier. In the configuration of FIG. 1A rotation is permitted in one direction only and in the other configuration (FIG. 1C) the reverse direction only. It is possible to hold the ratchet in the neutral position as shown in FIG. 1B in which rotation is permitted in either direction. Instead of 'teeth' the ratchet can comprise slots in an otherwise smooth surfaced cylinder. This is shown in the ratchet collar 80 in FIG. 8 which has smooth surface 52 interrupted by a series of axially extending spaced slots 51 to form the ratchet 'teeth'.

When the ratchet is operating in either the configuration of FIG. 1A or FIG. 1C each time, in the direction of permitted rotation, the pawl 50 lifts over the teeth as rotation is effected, effectively slightly compressing the spring 49 each time. This results in greater torque being required to effect rotation than would otherwise be the case for rotation without the ratchet.

The technique of WO2015/039703 seeks to improve upon prior art techniques (for example disclosed in WO2006/030212 and GB2494548 by utilizing slip cutting in a more controlled and consistent manner. In accordance with WO2015/039703, a loop of the cutting line is formed around the periphery of the entire windscreen 101 in the set up procedure and the cutting line is attached at opposed ends to each of the respective winders spools.

In setting up, the winder unit is initially provided (loaded) with a significant length of the line already wound onto the respective winder spools and positioned on the inside of the windshield. The winder spool ratchets are toggled to the ratchet position which permits the cutting line to be drawn off the respective winder spools and line is pulled off the loaded unit, separate lengths 41a 41b being drawn around pulleys 8, 9 crossed over as shown in FIG. 2. A pinched apex 41c of the loop of line 41 is drawn out and pushed through a hole formed in the PU bonding bead. Thus the pinched apex 41c of the line 41 is drawn from inside to outside the vehicle, at a position below the winder unit 1.

Figure 3:
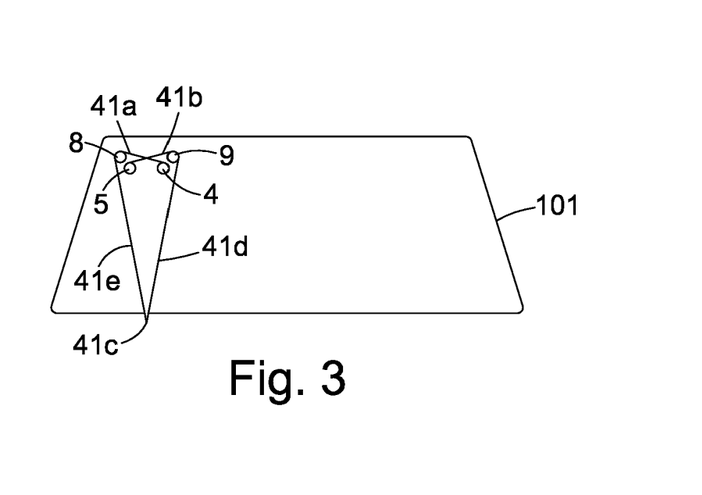
FIGS. 3 and 4 are schematic representations in sequence of a cut out technique in accordance with the invention.
Figure 4:
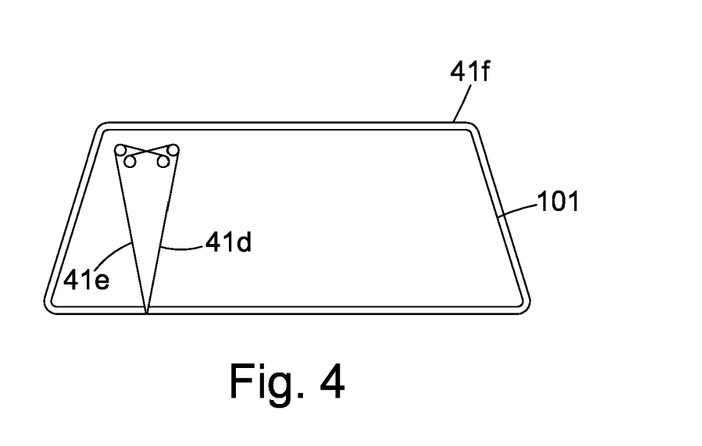

Next the loop of the line is expanded and looped around the entire periphery of the windshield 101 externally of the vehicle and positioned adjacent the PU bead. This is shown in FIG. 3, where the unit 1 is positioned internally of the vehicle and the lengths 41d 41e are also internally but the remainder of the loop 41f is externally of the vehicle. When in position as shown in FIG. 3, the winder spools can be operated as described above to slip cut the PU bead and release the windscreen from the supporting frame.

In the cut out procedure when winding in on one of the winder spools 4, 5 the other is configured to allow the cutting line to be drawn off the respective spool. In other words the line is attached to both spools during the cutting procedure and slip is achieved by permitting winding off from one of the spools as the line is wound on to the other. As a result there can be constant slip cutting throughout substantially the entire process (certainly for the majority of the cut out process). This is achieved by means of toggling the ratchet mechanisms. The ratchets of the respective winder mechanism are toggled between a 'forward ratchet permitted' position—FIG. 1A and a 'reverse ratchet permitted'—FIG. 1C position (or a ratchet off/neutral position—FIG. 1B) to enable winding onto or off a respective winder spool 4, 5 during the cut out procedure. When the ratchet is operating in either the configuration of FIG. 1A or FIG. 1C each time, in the direction of permitted rotation, the pawl lifts over the teeth as rotation is effected effectively slightly compressing the spring each time. This results in greater torque being required to effect rotation than would otherwise be the case for rotation without the ratchet. More winding effort is therefore required which can be significant when added to the friction resistance caused by the line cutting through the bonding bead.

The present invention provides an improvement over the known prior art cutout devices by utilizing for the drive shaft spindle that drives the spools 4, 5 a rotational directional control mechanism which comprises 2 one-way rotational control devices cooperating in concert. For example the rotational directional control mechanism comprises a ratchet mechanism that can be selectively applied but which also comprises a one way clutch or bearing mounted on the shaft.

Figure 5:
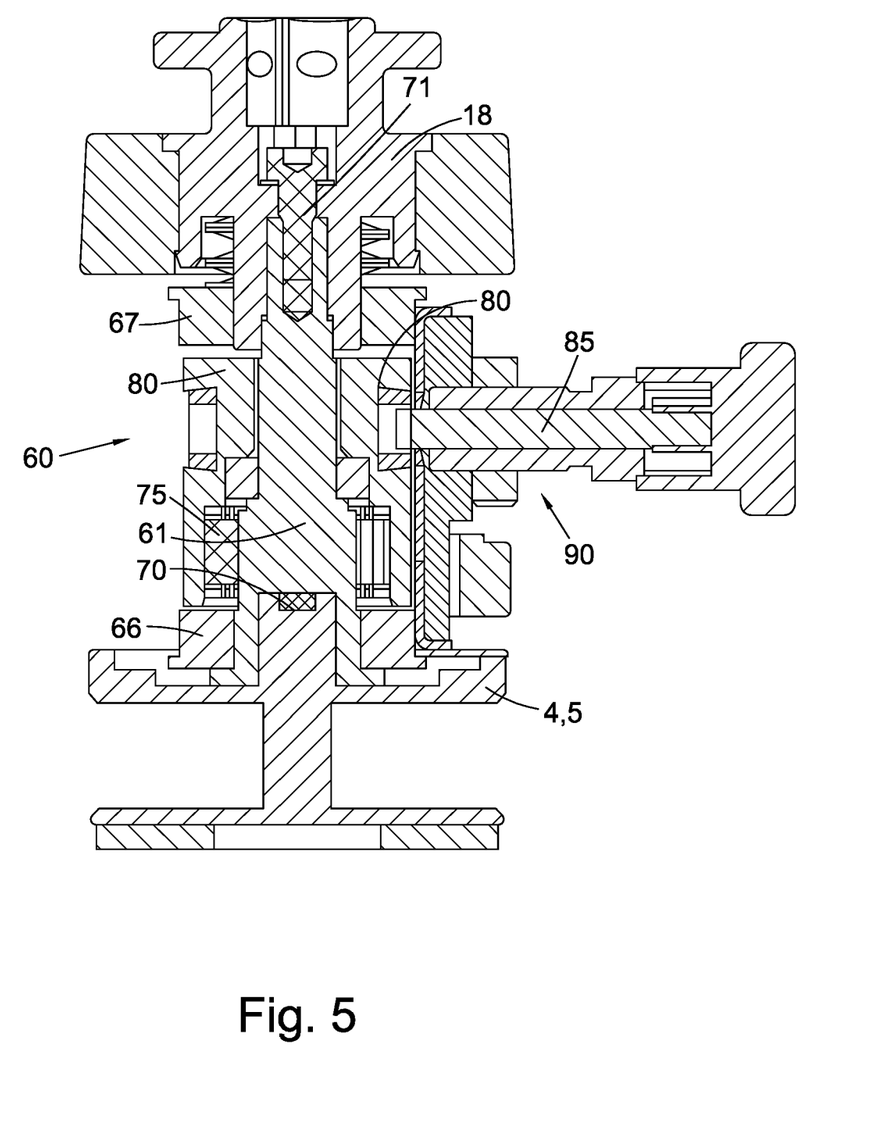
FIG. 5 is a sectional view of the drive spindle and spool of the unit according to the invention with the ratchet pawl mounted in position.
Figure 6:
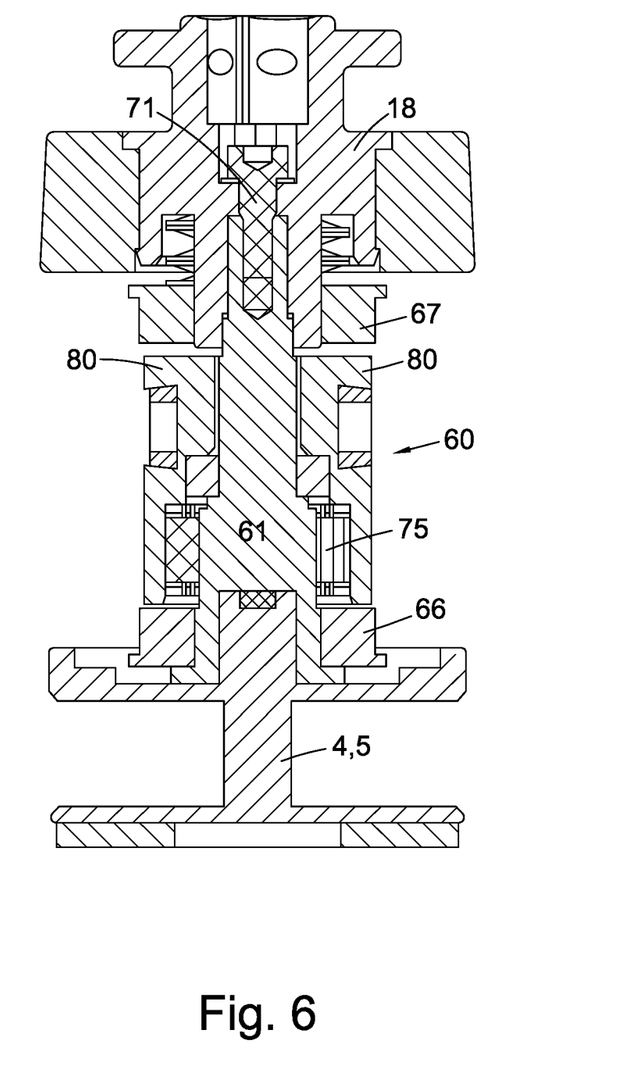
FIG. 6 is a view similar to FIG. 5 but with the ratchet pawl removed.
Figure 7:
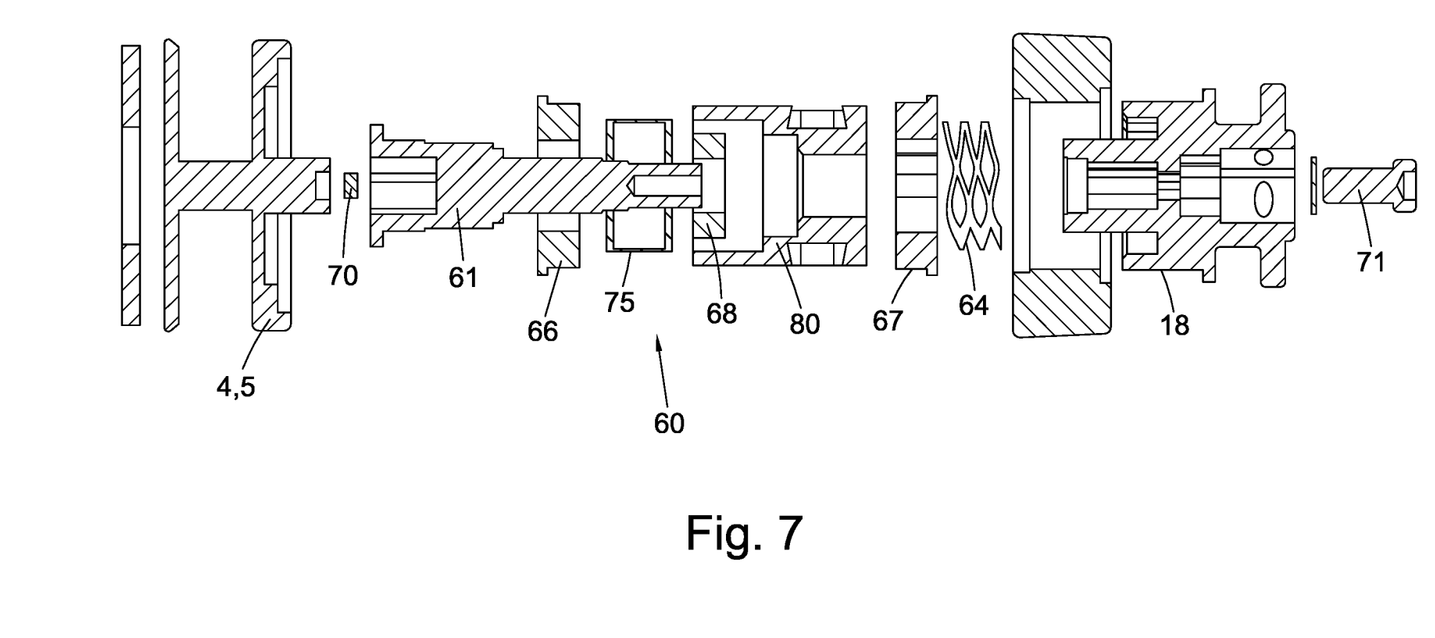
FIGS. 7 and 8 are exploded sectional and perspective views of the spindle of the unit according to the invention.

Referring to FIGS. 5 and 6, the drive spindle 60 includes a spindle shaft 61 for mounting the spool. The spindle shaft is connected at its other end to the drive boss 18. A cylindrical stator mounts the drive spindle 60 to the chassis 15 of the winder unit. Flange bearings 66, 67 connect the stator 63 to the drive shaft spindle. A magnet 70 is provided in a recess of a quick change spool to permit mounting to the drive shaft spindle. Other means of mounting may be used. The drive boss 18 as shown is fixed using a wave spring washer 64 and a machine screw 71 to the drive shaft spindle.

A one way rotational clutch or bearing 75 mounts the ratchet collar 80 to the spindle shaft 61. The ratchet collar is the item provided with the ratchet teeth and recesses extending around the collar. This feature enables rotation of the spindle shaft 61 to be governed or constrained by two means operating in concert, namely the one way clutch or bearing 75 and the ratchet mechanism (pawl 85 engaging in the slots 51 between the 'teeth' 52 on the ratchet collar 80). The one way clutch or bearing 75 acts such that torque is only transmitted between the drive shaft spindle and the mounted ratchet collar with rotation in one direction only. Such one way rotation devices are known in the art, for example as a sprag clutch or one way freewheel clutch. A sprag clutch operates in a similar way to a roller bearing, but instead of cylindrical rollers, non-revolving asymmetric figure-eight shaped sprags are used. When the unit rotates in one direction the asymmetric sprags slip or free-wheel to enable the spindle shaft 61 to rotate in that direction, but when a torque is applied in the opposite direction, the sprags tilt slightly, producing a wedging action and binding because of friction as a frictional engagement will be formed by the wedging action of the respective sprags on the spindle shaft 61 and the ratchet collar 80 to restrict movement in the opposite direction. The sprags are usually spring-loaded so that they lock with very little backlash.

As a result of such a mounting arrangement rotation of the drive spindle shaft can be controlled by the ratchet mechanism 90 (pawl 85 and ratchet collar 80) operating in concert with the one way clutch or bearing device 75. The impact of this is:

1. With the ratchet in neutral (i.e. pawl 85 totally disengaged from the ratchet collar 80). In this condition the spindle shaft 61 can be driven to rotate in the direction permitted by the one way clutch or bearing device 75. The ratchet collar 80 is not constrained by the ratchet pawl 85 and simply rotates in unison with the one way clutch or bearing device 75, such as the sprag clutch described above, in the direction permitted by the one way clutch or bearing device, i.e. the direction permitted by the shape of the sprags which form the sprag clutch. The ratchet has no application in that it does not actively influence the movement of the spindle shaft 61 but rather moves in unison with the spindle shaft 61. The spindle shaft 61 can freely rotate in one direction (i.e. the direction permitted by the one way clutch or bearing device 75). If the cutting line is being pulled off the spool 4, 5 in this condition it is easy to do so because there is very little resistance—freewheel condition. Operation is noiseless (ratchet 'clicks' are not heard). This condition can be preferred for the driving spindle shaft 61 because it minimizes winding torque. The freewheeling condition can also be used for fiber line cutting when pulling off the spool as fiber line is not prone to 'birds nesting' as wire is. This can be described as a mode in which the spindle shaft is arranged to freewheel in a first rotational direction but is inhibited from rotating in the opposed direction. That is to say, when the cutting line is being pulled off the spool 4, 5 the spindle shaft can freely rotate in the first direction, i.e. the dispensing direction, as the sprag clutch enables the spindle shaft 61 to move in the first direction due to the free-wheel condition of the sprag clutch. However, the movement of the spindle shaft 61 in the second direction, i.e. the opposite direction, movement of the spindle shaft 61 is inhibited by the wedging action of the respective sprags as the tilted sprags form a frictional engagement between the spindle shaft and the ratchet collar 80 which prevents movement of the spindle shaft 61.

2. In this mode, the ratchet 90 is applied and rotation of the spindle shaft 61 is permitted in the same sense as permitted by the one way bearing/clutch, i.e. the pawl 85 engages in the slots 51 between the teeth 52 on the ratchet collar and the one way clutch or bearing 75 mounts the ratchet collar 80 to the spindle shaft 61, thereby enabling the movement of the spindle shaft 61 to be influenced by the ratchet collar 80 and the pawl 85. The amount of engagement between the pawl 85 and the slots 51 can be adjusted. The higher the amount of engagement between the pawl 85 and the slot 51, the higher the amount of resistance offered by the pawl 85 to the movement of the spindle shaft 61. In this condition rotation of the spindle shaft 61 together with the one way clutch or bearing device 75 and the ratchet collar 80 is permitted in one direction but not the other (i.e. the direction permitted by the one way clutch or bearing device) but with some effect from the ratchet collar 80. The ratchet has effect so there is more resistance to rotation than in the one way freewheel state described above. The ratchet spring 49 force needs to be overcome during rotation. If the cutting line is being pulled off the spool in this condition it is less easy to do so because there is resistance in overcoming the ratchet spring force. The ratchet 'clicks' during operation. This situation can be of benefit if some resistance is required during slip cutting and also to prevent wire coming off the spool (birds nesting) under freewheel conditions during slip cutting. This can be described as a mode in which the spindle shaft is arranged to be rotatable against a selectively applied resistance. The resistance generated by the pawl 85 engaging in the slots 51 between the teeth 52 on the ratchet collar 80 and applying a small, but not an insurmountable, amount of resistance to the movement of the spindle shaft 61 in the first direction mean that movement of the spindle shaft 61 in the first direction is enabled—with some clicking. The mounting of the ratchet collar 80 to the spindle shaft 61 by way of the one way clutch or bearing 75 as described above means that movement of the spindle shaft in a second direction (a direction opposite to the first direction) is inhibited by the wedging action of the sprags which forms a frictional engagement between the sprags, the spindle shaft 61 and the ratchet collar 80.

3. With the ratchet 90 applied permitting rotation in the opposite sense permitted by the one way bearing/clutch 75. In this condition the ratchet (pawl 85 and collar 80) inhibits rotation in one direction and the one way clutch or bearing device prevents rotation in the other direction. The spindle is held against rotation in either direction. This can be described as a mode in which the spindle is inhibited from rotating altogether.

The drive shaft spindles 61 for the separate respective spools 4, 5 have one way bearing or clutch devices arranged to permit rotation in opposed senses.

The unit according to the invention having the rotational directional control mechanism which comprises 2 one-way rotational control devices cooperating in concert, provides technical superiority over known prior art winder units for cutting out glazing panels units.

The invention claimed is:

1. A winder unit for use in cutting out a vehicle glazing panel, the winder unit comprising:
a rotatable spindle shaft for winding;
a winder spool for winding cutting line used to cut out the vehicle glazing panel, wherein the winder spool is mounted to the spindle shaft; and
a ratchet device mounted to the spindle shaft by means of a one-way rotational bearing or clutch, wherein the ratchet device comprises a pawl and a ratchet collar, the ratchet collar having a plurality of recesses axially spaced along the spindle shaft from the one-way rotational bearing or clutch, and the pawl being configured to be engaged and disengaged from the plurality of recesses;
wherein operation of the spindle shaft is controlled by the ratchet device and the one-way rotational bearing or clutch, and wherein the ratchet device acts on the one-way rotational bearing or clutch to control operation of the spindle shaft.

2. The winder unit according to claim 1, wherein:
the ratchet device comprises a component mounted to rotate in unison with the one-way rotational bearing or clutch.

3. The winder unit according to claim 1, wherein:
the ratchet collar is mounted to the one-way rotational bearing or clutch.

4. The winder unit according to claim 1, wherein:
the one-way rotational bearing or clutch comprises a one way freewheel device.

5. The winder unit according to claim 1, wherein:
the one-way rotational bearing or clutch comprises a sprag clutch.

6. The winder unit according to claim 1, wherein:
the winder spool is demountable from the spindle shaft.

7. The winder unit according to claim 1, further comprising:
mounting means for mounting the winder unit to the vehicle glazing panel, wherein the mounting means comprises at least one sucker device.

8. The winder unit according to claim 1, further comprising:
at least one rotatable guide pulley spaced from the spindle shaft, wherein the guide pulley is configured to guide the cutting line.

9. The winder unit according to claim 1, further comprising:
a plurality of spindle shafts for mounting respective winder spools, wherein the plurality of spindles shafts are spaced from one another.

10. The winder unit according to claim 9, wherein:
each spindle shaft of the plurality of spindle shafts comprises a respective ratchet device being mounted to the respective spindle shaft by means of a respective one-way rotational bearing or clutch.

11. The winder unit according to claim 10, wherein:
one spindle shaft of the plurality of spindle shafts has a one way bearing or clutch device arranged to permit rotation in an opposed sense to the direction of rotation permitted by another one-way bearing or clutch device mounted to another spindle shaft of the plurality of spindle shafts.

12. The winder unit according to claim 1, wherein:
the ratchet device and the one-way rotational bearing or clutch cooperate in a mode in which the spindle shaft is arranged to freewheel in a first rotational direction but is inhibited from rotating in the opposed direction.

13. The winder unit according to claim 1, wherein:
the ratchet collar defines an interior surface configured to receive the one-way bearing or clutch, wherein the interior surface is axially spaced along the spindle shaft from the plurality of recesses.

14. The winder unit according to claim 1, wherein:
the plurality of recesses comprise slots or openings defined by the ratchet collar, wherein the slots or openings are circumferentially spaced about the ratchet collar.

* * * * *